June 1, 1965 C. F. WILLIAMS 3,186,666
FISHING ROD SUPPORT
Filed Oct. 14, 1963
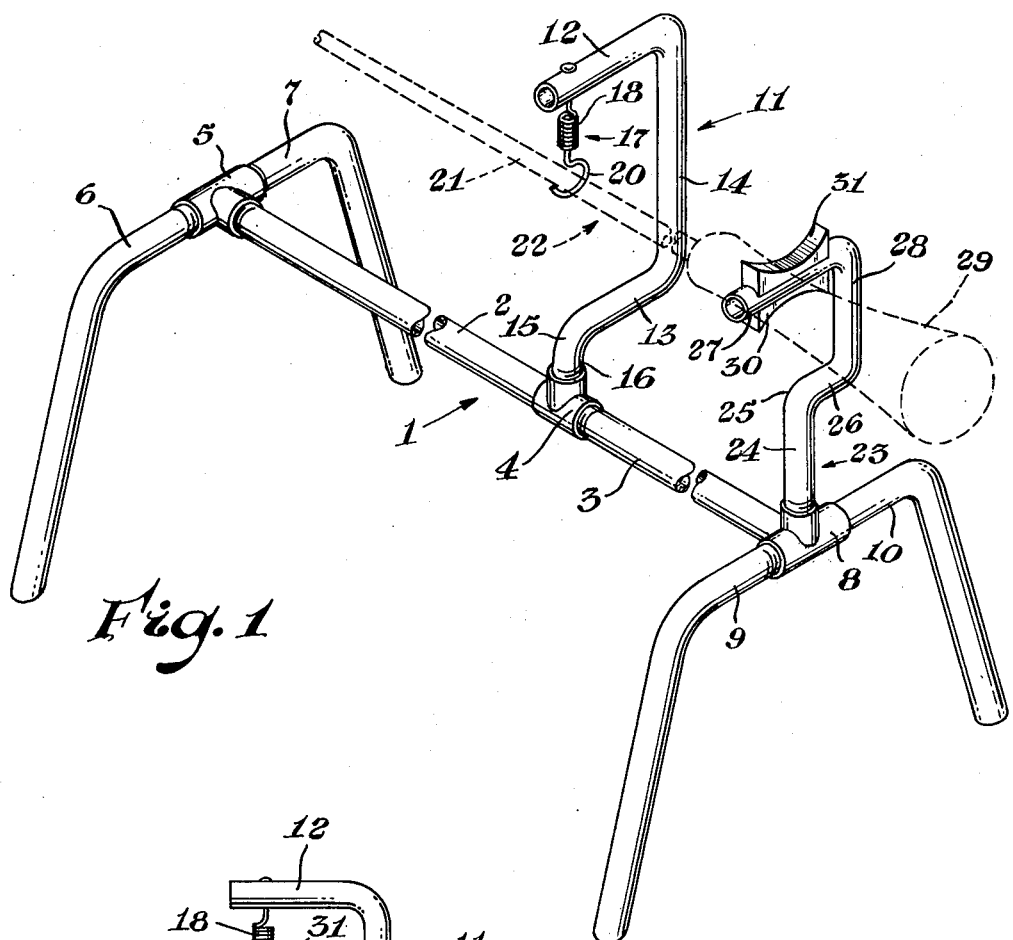
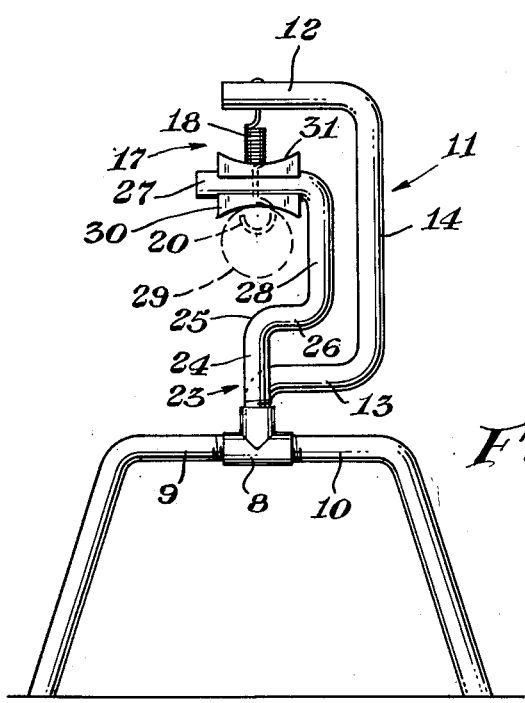
INVENTOR.
Charles F. Williams
BY
Learman, Learman & McCulloch
ATTORNEYS 3,186,666
FISHING ROD SUPPORT
Charles F. Williams, 3093 S. Eugene, Flint, Mich.
Filed Oct. 14, 1963, Ser. No. 315,881
9 Claims. (Cl. 248—44)

This invention relates to apparatus for supporting a fishing rod and more particularly to a device that is capable of removably supporting a fishing rod in fishing position while permitting sufficient movements of the rod to impart lifelike movements to bait secured to the fishing line.

Fishermen frequently find it necessary to release a fishing rod after the bait or lure has been cast into the water and, in the absence of some kind of support for the rod, it usually is laid upon the ground or on the bottom of a boat during the period of time that the fisherman's hands are otherwise occupied. These practices are undesirable for the reason that sand or dirt may find its way into the reel mechanism and damage the latter. In addition, there always is the possibility that the rod may fall from the bank of a stream or from a boat into the water, where the rod and reel may be damaged or lost. Many fishermen utilize two or more fishing rods simultaneously and, in the absence of some kind of support, the unattended rod or rods are treated in the manner previously described.

Many kinds of fishing rod supporting devices have been proposed in the past and which have been designed to overcome to some extent the disadvantages inherent in leaving a fishing rod unattended on the ground or in a boat. However, the known fishing rod supports have certain disadvantages. For example, some of the supports are so designed as to permit a rod merely to be cradled in the support, thereby making it possible to jar the rod inadvertently and knock it off the support. Other rod supports clamp the rod in place, thereby making it difficult to separate the rod from the support without risk of losing a fish that has taken the bait. Still other supports are adapted for use on land or on boats, but are not usable both on land and in boats. Finally, none of the known fishing rod supports is capable of supporting a rod in such manner that the rod may be acted upon by a breeze or by gentle rocking of a boat to impart lifelike movements to the bait so as to increase the chances of the bait's attracting the attention of a fish.

An object of this invention is to provide a support for a fishing rod which is capable of yieldably supporting a rod in fishing position and in such manner as to permit gentle movements of the rod so as to impart lifelike movements to the bait.

Another object of the invention is to provide a fishing rod support which is equally adapted for use in boats and on land.

A further object of the invention is to provide a fishing rod support which securely but yieldably supports a fishing rod and which permits rapid separation of the rod from the support when desired.

Another object of the invention is to provide a fishing rod support of the kind described and which is composed of a plurality of separable sections which may be dismantled from one another to facilitate storage and carrying of the support.

Other objects and advantages of the invention will be pointed out specifically or will become apparent from the following description when it is considered in conjunction with the appended claims and the accompanying drawing, in which:

FIGURE 1 is a frgamentary, perspective view of a fishing rod support constructed and assembled in accordance with the invention; and FIGURE 2 is an end elevational view of the apparatus shown in FIGURE 1.

A fishing rod support constructed in accordance with the invention comprises an elongated base member 1 composed of a pair of rod sections 2 and 3 having their confronting ends removably connected to a T fitting or coupling 4. At one end of the support member 1 is a T fitting or coupling 5 which removably receives the one end of the base member and which also removably receives a pair of legs 6 and 7 which project laterally from the base 1 a short distance and then extend downwardly at an incline. At the opposite end of the base rod 1 is another fitting or coupling 8 which removably receives the adjacent end of the rod and a pair of legs 9 and 10 which are similar in all respects to the legs 6 and 7. The legs may rest upon the ground or on the bottom of a boat and provide a stable structure to support the base member 1 above ground or boat bottom level.

Means is provided for supporting a fishing rod and comprises a support member 11 having a pair of substantially parallel leg sections 12 and 13 joined one to another at corresponding ends by an upstanding web 14 so as to form a substantially U-shaped member that is open at one side. The leg portion 13 is laterally bent as at 15 to form an extension 16 that preferably is threaded for reception in the T fitting 4, so as rotatably and removably to mount the member 11 on the base 1.

Yieldable means 17 is provided to suspend a fishing rod from the support member and comprises a tension spring 18 connected at one end to the arm portion 12 and having a hook 20 at its other end. The hook 20 is adapted to receive the shaft 21 of a fishing rod 22 that is indicated in dotted lines in the drawing.

At a position spaced from the support member 11 and preferably at one end of the base member 1 is a stabilizing member 23 comprising a shank 24, one end of which is threadedly and rotatably received in the fitting or coupling 8 and being bent at its opposite end at 25 to form a laterally extending arm 26. Parallel to the arm 26 is a second arm 27 which assumes a substantially horizontal position in use, the arms 26 and 27 being joined at corresponding ends by a web section 28. As is indicated in the drawing, the stabilizing member 23 is substantially U-shaped and has an open side at the side corresponding to the open side of the support member 11.

The handle 29 of the fishing rod 22 may be received between the parallel arms 26 and 27 with the arm 27 overlying the handle and thereby enable the fishing rod to be suspended from the spring member 17 in such manner as to tend to cause the fishing rod to rock in a counter-clockwise direction, as viewed in FIGURE 1, about the spring hook 20, but the arm 27 will prevent such rocking and thereby stabilize the rod. Preferably, the arm 27 is provided with a block 30 on its lower surface having an arcuate surface which centers the handle 29 under the arm 27. A similar block 31 may be provided on the upper surface of the arm 27 for a purpose presently to be explained.

To condition the apparatus for use, the legs are assembled with the base member 1, and the supporting and stabilizing members 11 and 23, respectively, are assembled with the base and are so arranged that their open sides face either to the left or to the right. Thereafter, the shaft 21 of the fishing rod may be placed in the hook 20 and at such position that the rod tends to rock counterclockwise about the fulcrum formed by the hook. The handle 29 then may be received in the stabilizing member 23 with the arm 27 overlying the handle so as to restrain rocking movement of the rod and stabilize the latter.

When the fishing rod and the supporting apparatus are assembled in the manner described, the resilience of the spring 18 will permit the rod to oscillate up and down and from side to side under the influence of a breeze or from the gentle rocking of a boat. The oscillation of the rod will impart lifelike movements to the bait or lure that is attached to the fishing line. The spring 17 and the stabilizing member 23, together with the arcuate member 30, cooperate to prevent inadvertent removal of the fishing rod from the supporting apparatus, but in the event of a strike, the rod may be disconnected quickly from the supporting apparatus merely by moving the rod laterally through the open sides of the members 11 and 23.

In the event that the fisherman does not wish to support the rod in such manner that the rod handle 29 is positioned under the stabilizing arm 27, the rod may be shifted rearwardly and supported atop the arm 27 on the arcuate member 31. When the rod is supported in this manner, its separation from the supporting apparatus may be effected somewhat more quickly.

The disclosed embodiment is illustrative of a presently preferred form of the invention, but is intended to be illustrative rather than definitive thereof. The invention is defined in the claims.

I claim:

1. A support for a fishing rod or the like comprising a base; yieldable means supported by said base above the latter for connection to a fishing rod between the ends of the latter; and stabilizing means having a substantially horizontal member supported on and spaced above said base for engagement with said rod either above or below the latter, said horizontal member being spaced from said yieldable means.

2. A support for a fishing rod or the like comprising a base; support means on said base and extending above the latter; spring means connected to and supported by said support means; means on said spring means for connecting the latter to a fishing rod to suspend said rod above said base; and stabilizing means having a substantially horizontal member supported on and spaced above said base for engagement with said rod either above or below the latter, said horizontal member being spaced from said support means.

3. A support for a fishing rod or the like comprising a base; support means on said base and extending above the latter; a spring having means at one end mounting it on said support means and means at its other end for connection to a fishing rod; and a stabilizing member supported on said base and having a rod engaging portion adapted to overlie said rod, said stabilizing member being spaced from said support means.

4. A support for a fishing rod or the like comprising a base member; a number of legs secured to said base member and being adapted to support said base member above ground level; a supporting member secured to said base member and extending above the latter; a spring suspended from said supporting member and having means for releasably engaging and suspending a fishing rod; and an upstanding stabilizing member secured to said base member and spaced from said supporting member, said stabilizing member being adapted to overlie a portion of said rod.

5. The construction set forth in claim 4 wherein said base member comprises a bar terminating at its opposite ends in coupling members, and wherein said legs are removably secured in said coupling members.

6. The construction set forth in claim 5 wherein one of said coupling members removably secures said stabilizing member to said base member.

7. The construction set forth in claim 5 including a coupling supported by said rod intermediate its ends and removably mounting said supporting member.

8. A support for a fishing rod or the like comprising an elongated base member terminating at its opposite ends in legs adapted to support said base member above ground level; a substantially U-shaped supporting member mounted on and above said base member between the ends of the latter, said supporting member having an opening at one side of the latter; a spring secured at one of its ends to said supporting member at the open side of the latter and having means at its opposite end for removably receiving a portion of a fishing rod; and a substantially U-shaped stabilizing member mounted on and above said base member at one end of the latter, said stabilizing member having an open side at the side corresponding to the open side of the supporting member and adapted removably to receive another portion of the fishing rod.

9. The construction set forth in claim 8 wherein said supporting member and said stabilizing member are rotatably mounted on said base member.

References Cited by the Examiner
UNITED STATES PATENTS

| 2,724,569 | 11/55 | Licata | 248—42 |
| 2,897,911 | 8/59 | Bowers | 211—182 |
| 2,985,414 | 5/61 | Ince | 248—42 |

CLAUDE A. LE ROY, *Primary Examiner.*